March 15, 1938.  L. M. DAVIS  2,111,090
AUTOMOBILE RADIO AERIAL
Filed May 3, 1937
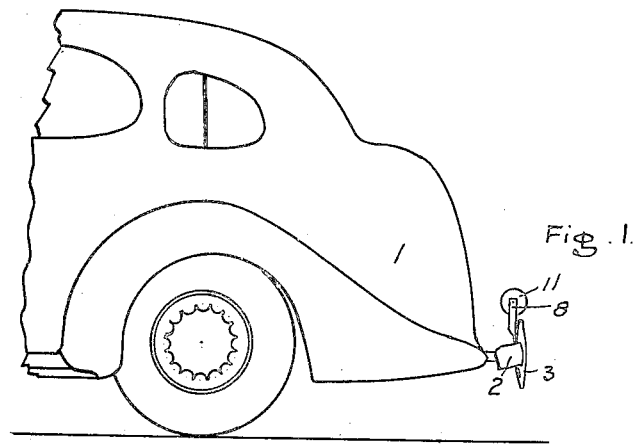
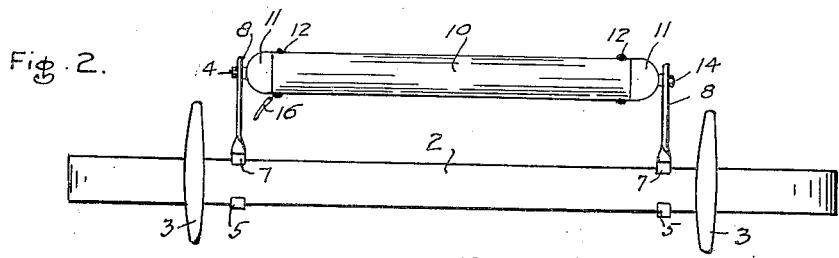
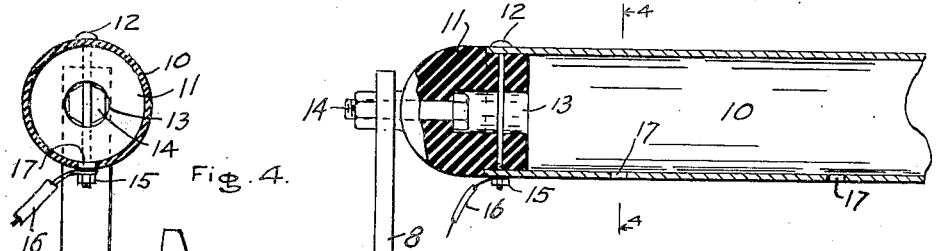
Inventor
Lester M. Davis
By
Attorney Patented Mar. 15, 1938

2,111,090

UNITED STATES PATENT OFFICE 2,111,090

AUTOMOBILE RADIO AERIAL

Lester M. Davis, Tacoma, Wash.

Application May 3, 1937, Serial No. 140,420

1 Claim. (Cl. 250—33)

This invention relates to aerials for automobiles for the purpose of collecting the radio waves for the radio instruments in the car. The objects are, first, to provide a device which is easily applied to a car, of whatever make, and connected up to the instruments in the car without disturbing in any way the structure of the car; second, to provide an aerial which will be effective even when used with the modern steel-topped cars; and third, which is light and cheap to make, and which is effective in use.

I attain these and other objects by the devices and arrangements illustrated in the accompanying drawing, in which—

Fig. 1 is a side view of the rear portion of an automobile, showing my device mounted thereon; Fig. 2 is a rear view of the rear bumper with my device mounted thereon; Fig. 3 is a similar view, drawn to a larger scale, and showing a portion thereof in vertical section to reveal the construction; and Fig. 4 is a cross-section thereof, taken on the line 4—4 in Fig. 3.

Similar numerals of reference refer to similar parts throughout the several views.

Great difficulty has been experienced in equipping steel-topped cars with radio instruments because of the interference caused by the continuous metal surface of the car. It will be seen by Fig. 1 that I mount my aerial on the rear bumper of the car in such manner that it is well removed from the car and from the bumper thus materially reducing the effect of the car on the reception of the radio influences.

Referring, now, to the drawing it will be seen that the car 1 is provided with a rear bumper 2 and that this bumper 2 is provided with the usual bumper guards 3. My apparatus is mounted on the bumper 2, preferably between the guards 3, by means of a pair of clamp brackets, shown principally in Figs. 3 and 4. Each clamp bracket comprises a lower member 4 formed with a hook 5 adapted to engage the lower edge of the bumper 2 and extending inward from the bumper towards the rear of the car. The upper member 6 is also provided with a hook 7, complementary to the hook 5, adapted to engage the upper edge of the bumper 2, and lies over the above-described lower member 4. This upper member 6 bends vertically upwards to form the bracket arm 8 which carries the aerial at its upper end. The two members 4 and 6 are clamped together by the clamp bolt 9, as shown in Fig. 4.

The aerial comprises a metal tube 10, preferably copper plated, and is held in horizontal position between the two bracket arms 8 at a point well removed from the car 1 and from the bumper 2. Each end of the tube 10 is provided with an insulator 11 secured therein by means of bolts 12. It will be seen from the drawing that the end of the insulator is slightly smaller than the tube 10 so as to enter the said tube, and that the bolt 12 passes through the tube diametrically and through this portion of the insulator 11 lying within the end of the tube. Each insulator 11 is provided with an axial cavity 13 from which the supporting bolt 14 extends through the insulator and through the upper end of the clamp bracket arm 8. Nuts 15 screw on the ends of the bolts 14 to secure the aerial to the bracket arms 8. Each supporting bolt 14 is, therefore, well removed from the charged securing bolts 12 which pin the tube 10 to the insulators 11. The wire 16, leading from the aerial tube 10 may be secured thereto by one of the holding bolts 12. The tube 10 is provided with suitable drain holes 17 to prevent the accumulation of moisture in the tube.

Thus it will be seen that I have provided a very simple and yet effective aerial for an automobile, and that said aerial is well insulated electrically from the car, is very easily applied to a car, and is sufficiently removed from the static influence of the large metal surface of the car to enable it to effectively receive the radio waves.

It is to be understood that the invention illustrated and described herein is in the preferred form but that many variations may be made in the details thereof without departing from the spirit of my invention as outlined in the appended claim; and that the words and terms used in the description and claim are chosen for convenience but are intended to be as generic in their meaning as the art will permit.

Having, therefore, described my invention, what I claim and desire to secure by Letters Patent, is:—

A radio antenna comprising a metallic tube open at both ends, an insulating plug fitted in each end of the tube and having an axial recess in its inner end, each plug having a bore leading from said recess coaxial therewith and opening through the outer end of the plug, a pin adjacent each end of the tube passing diametrically through the tube and through the plug adjacent the inner end thereof, each recess being of such depth that the pins are remote from the bottoms of the recesses and headed mounting bolts extending through said bores and having their heads seated in the bottoms of said recesses whereby said bolts are spaced sufficiently from said pins to minimize the capacity between the pins and bolts.

LESTER M. DAVIS.